(12) United States Patent
Kusaba et al.

(10) Patent No.: US 9,876,214 B2
(45) Date of Patent: Jan. 23, 2018

(54) BATTERY MODULE AND BATTERY UNIT

(71) Applicants: TOYODA GOSEI CO., LTD., Kiyosu-shi, Aichi-ken (JP); TOYOTA JIDOSHA KABUSHIKI KAISHA, Toyota-shi, Aichi-ken (JP)

(72) Inventors: Kosuke Kusaba, Kiyosu (JP); Yasunori Uchida, Kiyosu (JP); Kenji Kimura, Miyoshi (JP)

(73) Assignees: TOYODA GOSEI CO., LTD., Aichi-pref. (JP); TOYOTA JIDOSHA KABUSHIKI KAISHA, Toyota-shi (JP)

( * ) Notice: Subject to any disclaimer, the term of this patent is extended or adjusted under 35 U.S.C. 154(b) by 919 days.

(21) Appl. No.: 14/350,871

(22) PCT Filed: Sep. 25, 2012

(86) PCT No.: PCT/JP2012/006096
§ 371 (c)(1),
(2) Date: Jul. 1, 2014

(87) PCT Pub. No.: WO2013/061510
PCT Pub. Date: May 2, 2013

(65) Prior Publication Data
US 2014/0356689 A1    Dec. 4, 2014

(30) Foreign Application Priority Data

Oct. 26, 2011  (JP) ................................ 2011-234663

(51) Int. Cl.
*H01M 2/30* (2006.01)
*H01M 2/06* (2006.01)
(Continued)

(52) U.S. Cl.
CPC .......... *H01M 2/30* (2013.01); *H01M 2/0212* (2013.01); *H01M 2/0469* (2013.01); *H01M 2/06* (2013.01);
(Continued)

(58) Field of Classification Search
USPC ........................................................ 429/157
See application file for complete search history.

(56) References Cited

U.S. PATENT DOCUMENTS 4,374,186 A * 2/1983 McCartney ............. H01M 4/66
429/154
2006/0234119 A1* 10/2006 Kruger ................ H01M 2/1061
429/160

(Continued)

FOREIGN PATENT DOCUMENTS

JP        08-321329 A    12/1996
JP        2003323869 A * 11/2003
(Continued)

OTHER PUBLICATIONS

Machine Translation of JP 2003-323869 A, dated Nov. 14, 2003, retrieved Apr. 1, 2017.*

(Continued)

*Primary Examiner* — Maria Laios
*Assistant Examiner* — Robert S Carrico
(74) *Attorney, Agent, or Firm* — Posz Law Group, PLC

(57) ABSTRACT

An object of the invention is to provide an easy sealing technique of a battery element. A battery module has a battery element placed in the frame shape of an insulating middle frame body. This battery element is covered across the middle frame body by a positive electrode-side plate and a negative electrode-side plate to be contained. In the battery module, an insulating outer peripheral frame body is provided to cover outer peripheral plate sections of the positive (Continued)

electrode-side plate and the negative electrode-side plate along a circumference in a frame shape to include circumferential end faces of the positive and negative electrode-side plates and a circumferential end face of the middle frame body.

10 Claims, 21 Drawing Sheets

(51) Int. Cl.
| | |
|---|---|
| *H01M 2/20* | (2006.01) |
| *H01M 10/04* | (2006.01) |
| *H01M 2/02* | (2006.01) |
| *H01M 2/04* | (2006.01) |
| *H01M 2/10* | (2006.01) |
| *H01M 10/647* | (2014.01) |
| *H01M 10/6561* | (2014.01) |
| *H01M 10/613* | (2014.01) |

(52) U.S. Cl.
CPC ....... *H01M 2/1061* (2013.01); *H01M 2/1077* (2013.01); *H01M 2/204* (2013.01); *H01M 2/206* (2013.01); *H01M 10/0486* (2013.01); *H01M 10/0481* (2013.01); *H01M 10/613* (2015.04); *H01M 10/647* (2015.04); *H01M 10/6561* (2015.04)

(56) References Cited

U.S. PATENT DOCUMENTS

| | | | | |
|---|---|---|---|---|
| 2012/0009462 A1* | 1/2012 | Barter | ................. | H01M 2/1077 429/159 |
| 2012/0028097 A1* | 2/2012 | Oury | ................... | H01M 10/647 429/120 |
| 2012/0040221 A1* | 2/2012 | Stoughton | ........... | H01M 2/1061 429/120 |
| 2012/0040222 A1* | 2/2012 | Quick | ................. | H01M 10/647 429/120 |
| 2012/0045682 A1* | 2/2012 | Oury | ................. | H01M 10/0525 429/120 |

FOREIGN PATENT DOCUMENTS

| | | |
|---|---|---|
| JP | 2005-259379 A | 9/2005 |
| JP | 2006-210218 A | 8/2006 |
| JP | 3805275 B2 | 8/2006 |
| JP | 2011-014278 A | 1/2011 |
| WO | 2005/096412 A1 | 10/2005 |
| WO | 2006/059455 A1 | 6/2006 |
| WO | 2010/099906 A2 | 9/2010 |
| WO | 2011/002051 A1 | 1/2011 |

OTHER PUBLICATIONS

International Search Report of the International Searching Authority dated Nov. 13, 2012 for the corresponding international application No. PCT/JP2012/006096 (with English translation).

* cited by examiner

BATTERY MODULE AND BATTERY UNIT

CROSS REFERENCE TO RELATED APPLICATIONS

The present disclosure is a U.S. national stage application of International Patent Application No. PCT/JP2012/006096 filed on Sep. 25, 2012 and is based on Japanese Patent Application No. 2011-234663 filed on Oct. 26, 2011, the disclosure of which is incorporated herein by reference.

TECHNICAL FIELD

The present invention relates to a battery module containing a battery element, as well as to a battery unit.

BACKGROUND ART

With respect to a battery module, various techniques have been proposed to meet a need to contain and seal a battery element from the ambient air. For example, a proposed technique contains a battery element in a battery case and seals the battery element by joining and welding or bonding resin components along the circumference of the battery element (PTL1).

CITATION LIST

Patent Literatures

PTL1: Japanese Patent No. 3805275

SUMMARY OF INVENTION

Technical Problem

There are various types of battery elements. For example, in a chargeable and dischargeable type of battery element, an inert gas is generated during charging or discharging to raise the internal pressure of the battery module. Such an increase in internal pressure may lead to leakage of a gas from the joint position between the resin components. There is accordingly a need to securely and thoroughly weld or bond the resin components at the joint position, in order to prevent a potential gas leakage. This is rather troublesome. Accidental application of a load, such as vibration or impact, to the joint position between the resin components may cause a gap between the resin components. Careful handling is accordingly needed, and this is also troublesome.

By taking into account the problem described above, an object of the invention is to provide an easy sealing technique of a battery element.

Solution to Problem

In order to achieve at least part of the above objects, the present invention is implemented by any of aspects and embodiments described below.

According to a first aspect of the invention, there is provided a battery module containing a battery element. The battery module comprises: an insulating frame body formed in a frame shape to surround and contain the battery element; conductive first and second plates provided to cover the battery element contained in the frame shape of the frame body across the frame body; and an insulating outer peripheral frame body provided to cover outer peripheral plate sections of the first and second plates along a circumference in a frame shape to include circumferential end faces of the first and second plates and a circumferential end face of the frame body.

The battery module of the first aspect seals the battery element by covering the battery element contained in the frame shape of the insulating frame body by the first and second plates and covering the outer peripheral plate sections of the first and second plates along the circumference in the frame shape by the insulating outer peripheral frame body. Covering along the circumference in the frame shape by the insulating outer peripheral frame body includes covering of the circumferential end faces of the first and second plates and the circumferential end face of the frame body but does not include joining between resin components. The battery module of the first aspect thus readily seals the battery element.

The battery module of the first aspect described above may employ the following configurations. According to one embodiment, the frame body with the battery element contained in the frame shape may be integrated with the first and second plates. In other words, this provides a sub-assembly product, in which the frame body is integrated with the first and second plates. The sub-assembly product in which the frame body is integrated with the first and second plates is subject to covering along the circumference in the frame shape by the insulating outer peripheral frame body. This facilitates the covering process.

According to another embodiment, the outer peripheral frame body may be formed by insert molding using an insulating resin. This readily forms the insulating outer peripheral frame body for covering along the circumference in the frame shape. In this embodiment, the outer peripheral plate sections of the first and second plates may be joined with the outer peripheral frame body.

According to another embodiment, the frame body may hold positive and negative collector foils of the battery element. The first plate may have electrical continuity with one of the positive and negative collector foils held by the frame body. The second plate may have electrical continuity with the other of the positive and negative collector foils held by the frame body. Outer surfaces of the first and second plates may be located outward from the outer peripheral frame body. This configuration causes the outer surfaces of the first and second plates that form the outermost surfaces of the battery module to be provided as positions of electrical connection with other battery modules. This readily ensures electrical connection between adjacent battery modules by simply stacking battery modules.

According to another embodiment, the first and second plates may be metal plates and may respectively be welded to the positive and negative collector foils. This ensures electrical continuities between the first and second plates and the positive and negative collector foils.

According to another embodiment, each of the first and second plates may be formed in a convex shape that is convex outward from the battery element contained in the frame body to have a recess in which the battery element contained in the frame shape of the frame body is placed. The convex shape enhances the strengths of the first and second plates. This improves the strength of each battery module and also ensures the strength of the battery modules stacked and bound in the stacking direction against the binding force.

According to another embodiment, the frame body may be split at specific facing frame positions into two sections. This facilitates the battery element to be placed in the frame shape of the frame body. Even after the battery element is covered by the first and second plates without the frame body, the split structure of the frame body causes the battery element to be readily placed in the frame shape of the frame body.

According to another embodiment, the outer peripheral frame body may have a positioning engagement element to engage with and position the outer peripheral frame body of an adjacent battery module in a state of stacking a plurality of the battery modules. This facilitates stacking of battery modules.

According to another embodiment, each of the first and second plates may have a projection on an outer surface, which joins with the projection of an adjacent battery module on top faces of the projections in a state of stacking a plurality of the battery modules. This ensures the electrical continuity between adjacent battery modules via the projections joined with each other on their top faces in the state of stacking the battery modules. Under application of a binding force to the stacked battery modules, the contact of the adjacent battery modules via the narrow areas of the top faces of the projections increases the contact pressure and accordingly enhances the reliability of the electrical continuity between the adjacent battery modules in the state of stacking the battery modules. It is preferable that such projections are arranged at intervals over the outer surfaces of the first and second plates.

According to a second aspect of the invention, there is provided a battery unit comprising a plurality of the battery modules described above, wherein the plurality of the battery modules are stacked, and a binding force along a stacking direction is applied to the stacked battery modules.

The battery unit according to the second aspect is configured by simply stacking the battery modules and applying a binding force to the stacked battery modules.

DESCRIPTION OF EMBODIMENTS

Figure 1:
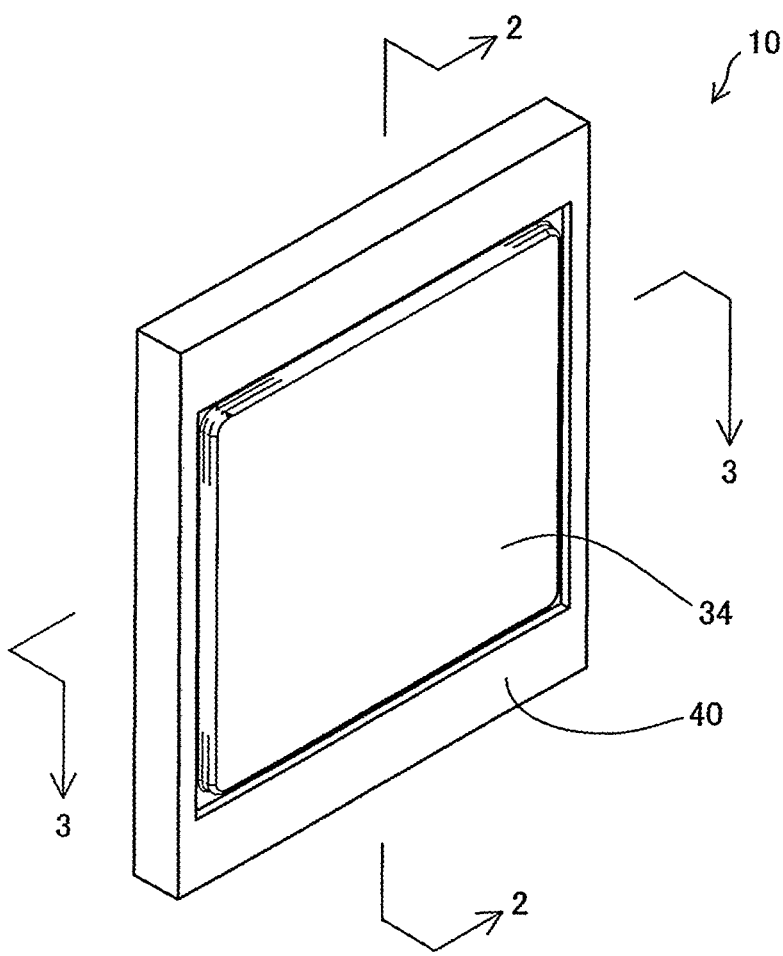
FIG. 1 is a perspective view illustrating the appearance of a battery module 10 according to an embodiment of the invention.
Figure 2:
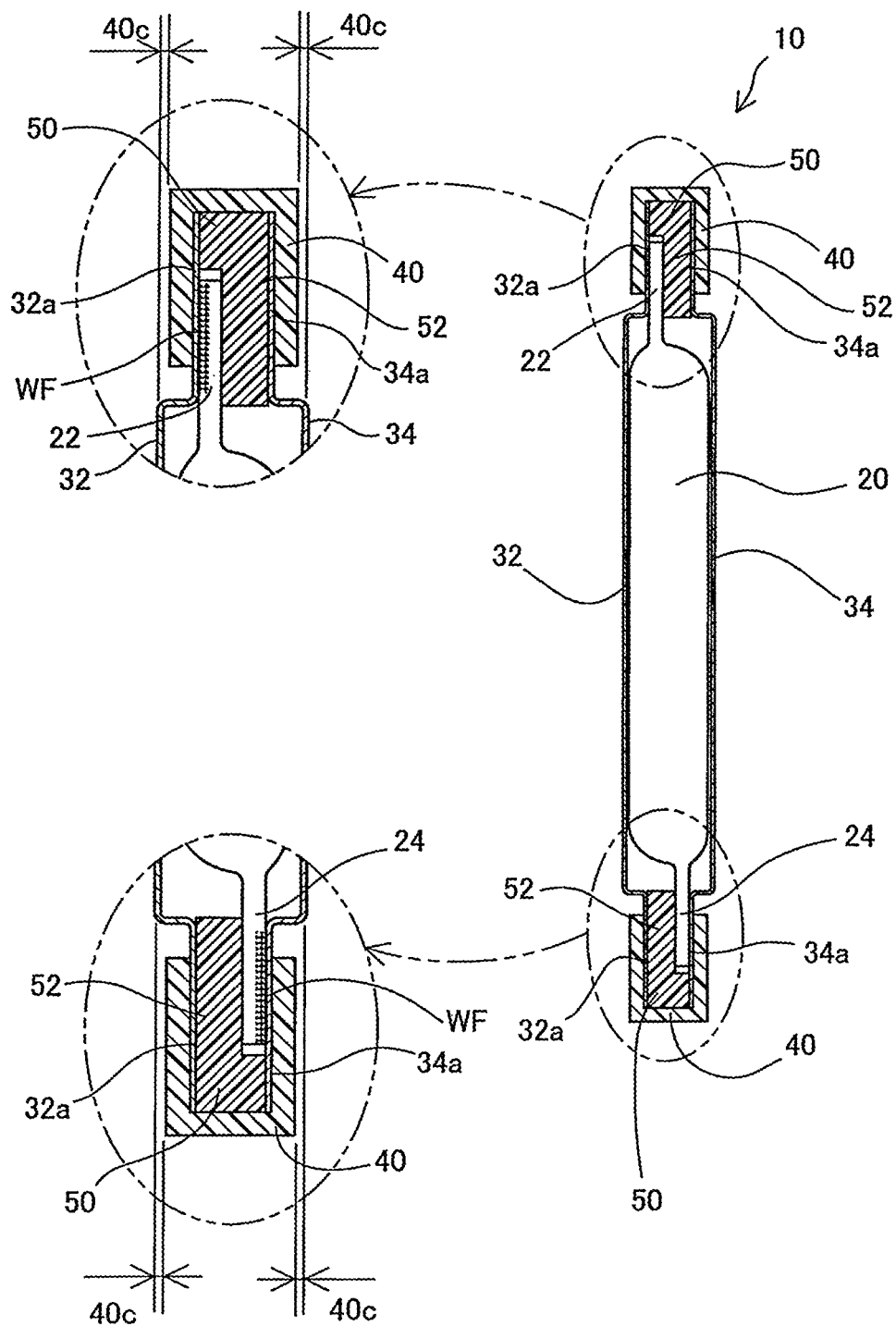
FIG. 2 is a diagram illustrating a cross sectional view taken along a line 2-2 in FIG. 1 and enlarged views of main parts.
Figure 3:
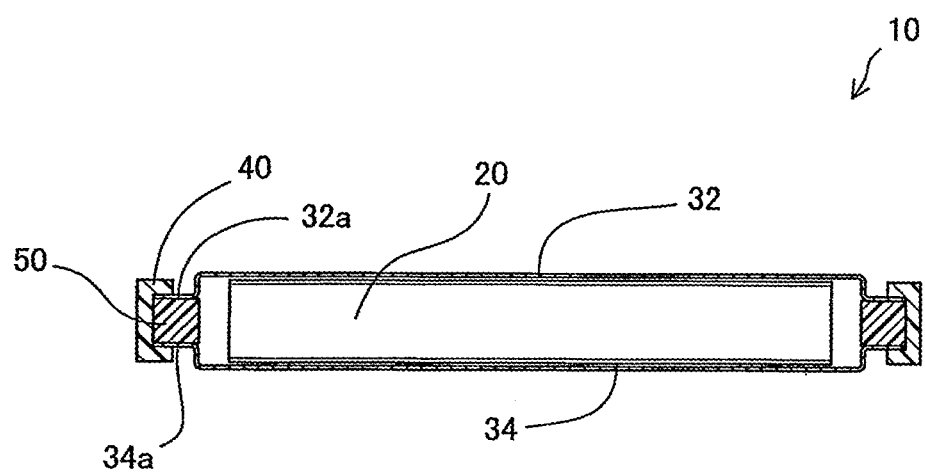
FIG. 3 is a schematic cross sectional view taken on a line 3-3 in FIG. 1.
Figure 4:
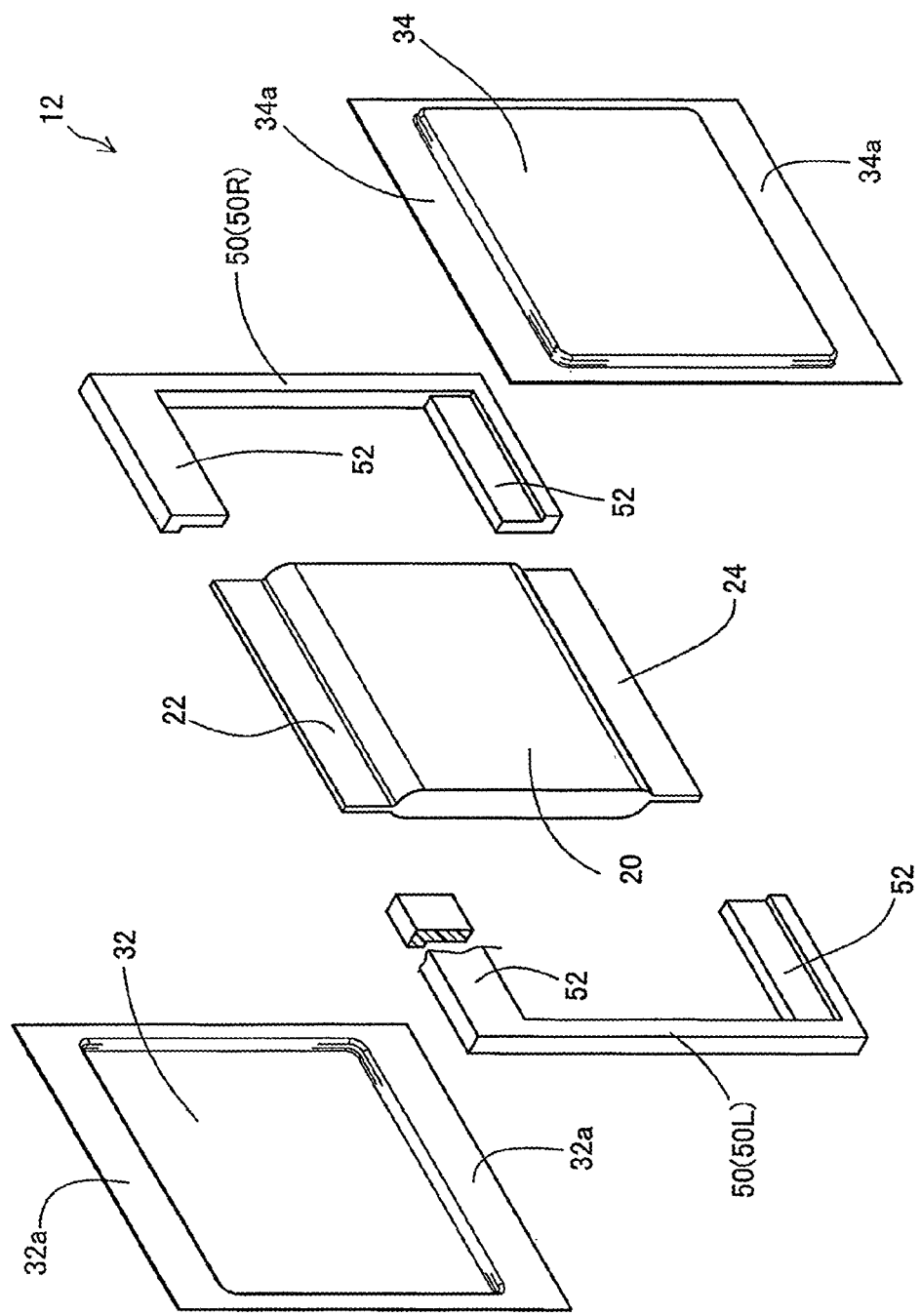
FIG. 4 is an exploded perspective view of a sub-assembly product 12 including a battery element 20.

The following describes some aspects of the invention as embodiments with reference to accompanied drawings. FIG. 1 is a perspective view illustrating the appearance of a battery module 10 according to an embodiment of the invention. FIG. 2 is a diagram illustrating a cross sectional view taken along a line 2-2 in FIG. 1 and enlarged views of main parts. FIG. 3 is a schematic cross sectional view taken on a line 3-3 in FIG. 1. FIG. 4 is an exploded perspective view of a sub-assembly product 12 including a battery element 20.

As illustrated in these diagrams, the battery module 10 includes a battery element 20, a positive electrode-side plate 32, a negative electrode-side plate 34, an outer peripheral frame body 40 and a middle frame body 50. The battery element 20 is a battery unit of, for example, a lithium secondary battery which is chargeable and dischargeable and is formed in a flat rectangular shape having a positive electrode collector foil 22 protruded from one end and a negative electrode collector foil 24 protruded from the other end. This battery element 20 is generally structured by winding metal thin films for a positive electrode and a negative electrode with an electrolyte placed therebetween. This structure is not directly related to the scope of the invention and is not specifically described here.

The middle frame body 50 is an insulating resin molded product and is split vertically at specific facing frame positions into two sections, i.e., a left-side frame section 50L and a right-side frame section 50R in the illustration as shown in FIG. 4. This middle frame body 50 is assembled in a frame shape to surround the battery element 20 by joining the above left-side and right-side frame sections 50L and 50R with each other on their opening end faces. The middle frame body 50 includes wide frame parts, i.e., upper and lower frame parts in FIG. 4, which serve as collector foil holding parts 52. The collector foil holding part 52 are formed to have steps inside the frame to hold the positive electrode collector foil 22 and the negative electrode collector foil 24 of the battery element 20 set in the frame shape of the middle frame body 50. In this embodiment, the steps of the collector foil holding parts 52 are formed to have the level difference equal to the thickness of the above positive and negative electrode collector foils 22 and 24 as shown in FIG. 2, so that the collector foil holding parts 52 of the middle frame body 50 hold the positive electrode collector foil 22 and the negative electrode collector foil 24 to be flush. The collector foil holding parts 52 are formed to have the width substantially equal to the width of the above positive and negative electrode collector foils 22 and 24 in the assembled state that the left-side frame section 50L and the right-side frame section 50R are joined with each other on their opening end faces. The middle frame body 50 accordingly holds the positive electrode collector foil 22 and the negative electrode collector foil 24 fit in the collector foil holding parts 52. In other words, the middle frame body 50 is integrated with the battery element 20 by fitting the positive and negative electrode collector foils 22 and 24 into the collector foil holding parts 52. The details will be described later.

The positive electrode-side plate 32 is a press-formed product of a metal steel plate, for example, aluminum steel plate, which is made of the same material as that of the positive electrode collector foil 22 of the battery element 20. The positive electrode-side plate 32 has a convex center section, which is convex outward from the inner battery element 20, and an outer peripheral plate section 32a of a flat plate surrounding the convex center section. The negative electrode-side plate 34 is a press-formed product of a metal steel plate, for example, copper steel plate, which is made of the same material as that of the negative electrode collector foil 24 of the battery element 20. The negative electrode-side plate 34 has a convex center section, which is convex outward from the inner battery element 20, and an outer peripheral plate section 34a of a flat plate surrounding the convex center section. The positive and negative electrode-side plates 32 and 34 have recesses on the respective rear faces of the outward convexes, which are joined with each other to form a space for containing the battery element 20 and cover the battery element 20 placed in the frame shape of the middle frame body 50 across the middle frame body 50. The outer peripheral plate section 32a of the positive electrode-side plate 32 is welded to the positive electrode collector foil 22 of the battery element 20 in a welding region WF shown in FIG. 2. Similarly, the outer peripheral plate section 34a of the negative electrode-side plate 34 is welded to the negative electrode collector foil 24 of the battery element 20 in a welding region WF shown in FIG. 2. This welding integrates the positive electrode-side plate 32 and the negative electrode-side plate 34 with the battery element 20 and ensures the electrical continuity between the positive electrode-side plate 32 and the positive electrode collector foil 22 and the electrical continuity between the negative electrode-side plate 34 and the negative electrode collector foil 24.

The outer peripheral frame body 40 is formed by insert molding of an insulating resin as described later and covers the outer periphery of the battery module 10 along the entire module circumference as shown in FIG. 1. As shown in the cross sectional view of FIGS. 2 and 3, the outer peripheral frame body 40 covers the outer peripheral plate section 32a of the positive electrode-side plate 32 and the outer peripheral plate section 34a of the negative electrode-side plate 34, which face each other across the middle frame body 50, along the circumference in the frame shape to include the circumferential end faces of the positive electrode-side plate 32 and the negative electrode-side plate 34 and the circumferential end face of the middle frame body 50. As shown in FIG. 2, the outer peripheral frame body 40 has clearances 40c from the convex outer surface of the positive electrode-side plate 32 and the convex outer surface of the negative electrode-side plate 34. Accordingly, the battery module 10 is formed such that the convex outer surface of the positive electrode-side plate 32 and the convex outer surface of the negative electrode-side plate 34 are placed outside of the outer peripheral frame body 40.

Figure 5:
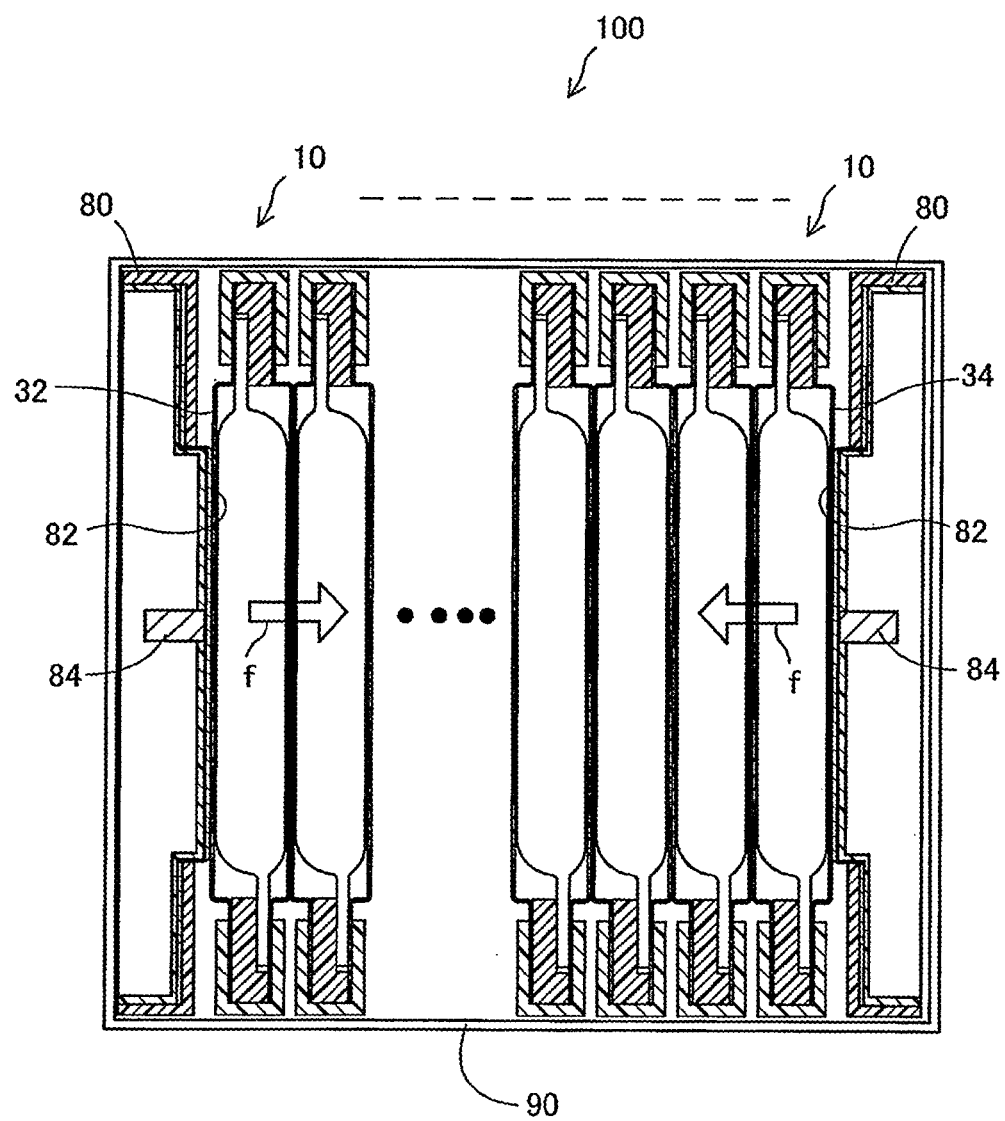
FIG. 5 is a diagram illustrating a cross sectional view of the general configuration of a battery unit 100 according to an embodiment.

FIG. 5 is a diagram illustrating a cross sectional view of the general configuration of a battery unit 100 according to an embodiment. As illustrated, this battery unit 100 has a stack structure formed by stacking a plurality of the battery modules 10 described above and includes collector modules 80 placed on both ends of the stack structure. The battery module 10 is formed such that the convex outer surface of the positive electrode-side plate 32 and the convex outer surface of the negative electrode-side plate 34 are placed outside of the outer peripheral frame body 40 as described above. The positive electrode-side plate 32 and the negative electrode-side plate 34 of the adjacent battery modules 10 are in contact with each other by simply stacking the battery modules 10 in a fixed direction. Simple stacking of the battery modules 10 electrically connects the battery modules 10 in series and ensures electrical connection between the respective battery modules 10 in the battery unit 100.

The collector module 80 includes a collector metal plate 82 and an external connection terminal 84 on its center portion. The collector metal plate 82 is in contact with the positive electrode-side plate 32 or the negative electrode-side plate 34 in the battery module 10 on each end of the stack structure. The battery unit 100 is thus dischargeable to output electric power to an external load such as a motor via the external connection terminals 84 of the collector modules 80 and is chargeable with electric power from an external power source via the external connection terminals 84.

The battery unit 100 is formed by placing the collector modules 80 on both ends of the battery modules 10 stacked in the stack structure and fastening the battery modules 10 and the collector modules 80 with a fastening belt 90. For the purpose of better understanding of the illustration, the fastening belt 90 is placed along the circumference of the battery unit 100 across some clearance in FIG. 5. In the actual state, however, the fastening belt 90 is clamped by a fastening metal fixture (not shown) to apply a binding force f to the respective stacked battery modules 10 as illustrated. This keeps the contact between the positive electrode-side plate 32 and the negative electrode-side plate 34 of the adjacent battery modules 10 and the contact between the positive electrode-side plate 32 or the negative electrode-side plate 34 and the collector module 80 and ensures the electrical connection therebetween as described above. The battery unit 100 is thus readily formed by simply stacking the battery modules 10, placing the collector modules 80 on both ends of the stack structure and fastening the battery modules 10 and the collector modules 80 with the fastening belt 90.

Figure 6:
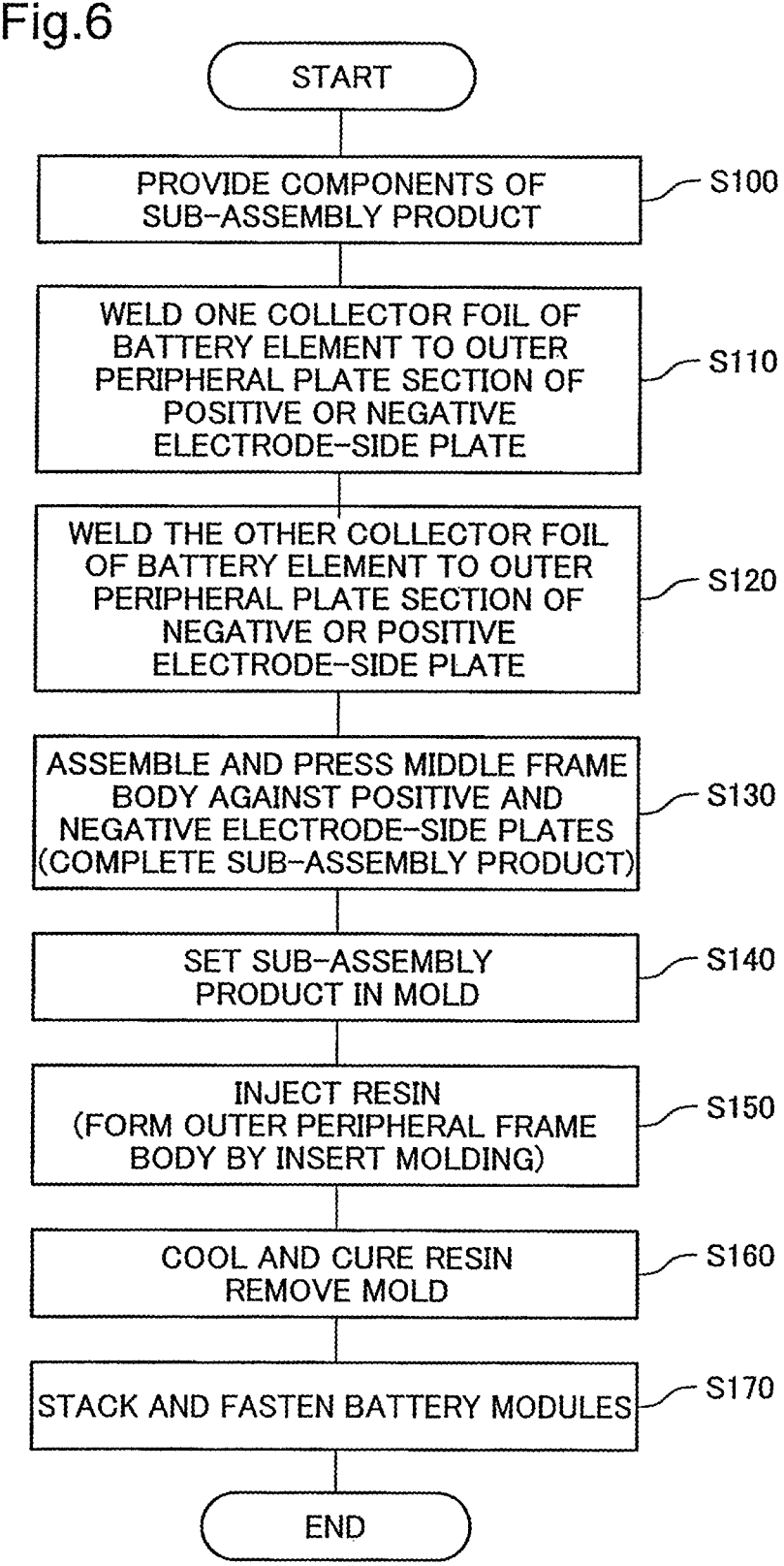
FIG. 6 is a flowchart showing a manufacturing process of the battery module 10 and the battery unit 100 according to the embodiment.
Figure 7:
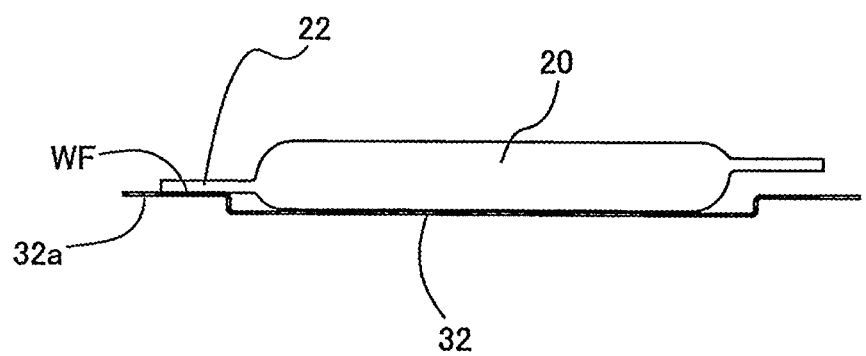
FIG. 7 is a diagram illustrating the state that the battery element 20 is integrated with a positive electrode-side plate 32.
Figure 8:
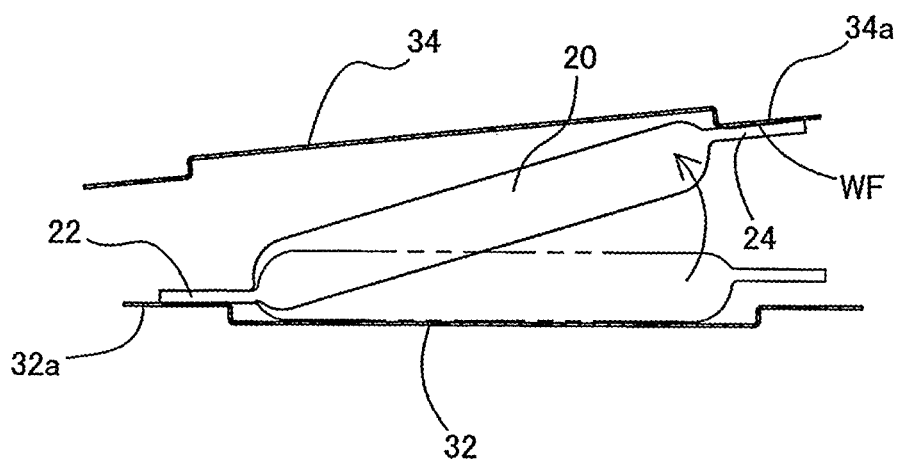
FIG. 8 is a diagram illustrating the state that the battery element 20 is further integrated with a negative electrode-side plate 34.
Figure 9:
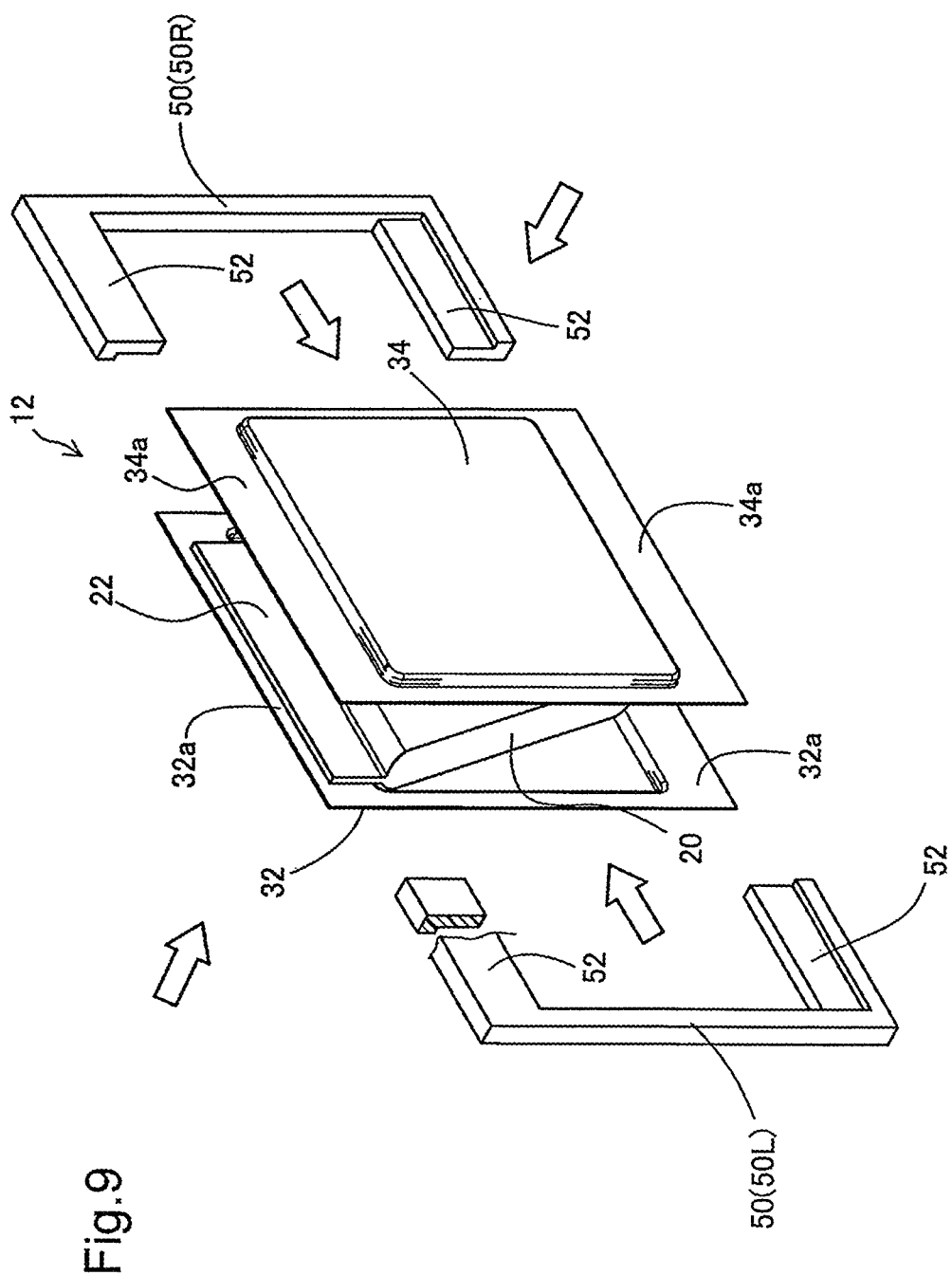
FIG. 9 is a diagram illustrating the state that a middle frame body 50 is integrated with the battery element 20 and the positive and negative electrode-side plates 32 and 34.
Figure 10:
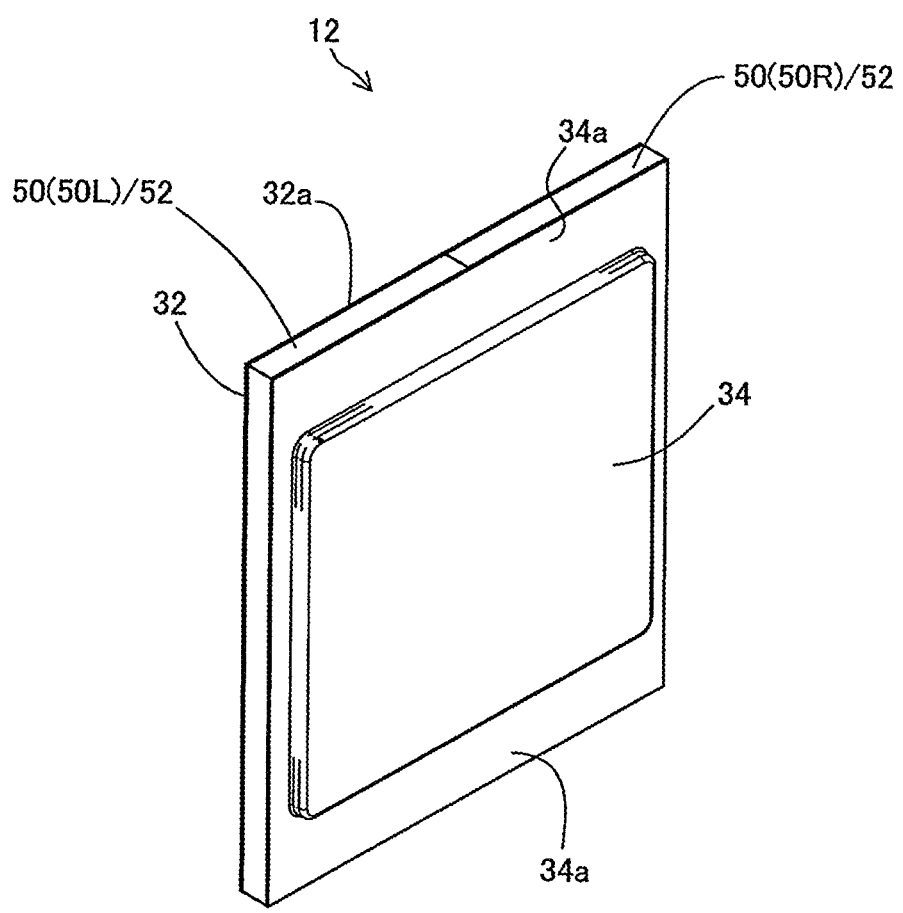
FIG. 10 is a perspective view illustrating the appearance of the sub-assembly product 12.

The following describes a manufacturing process of the battery module 10 and the battery unit 100 described above. FIG. 6 is a flowchart showing a manufacturing process of the battery module 10 and the battery unit 100 according to the embodiment. FIG. 7 is a diagram illustrating the state that the battery element 20 is integrated with the positive electrode-side plate 32. FIG. 8 is a diagram illustrating the state that the battery element 20 is further integrated with the negative electrode-side plate 34. FIG. 9 is a diagram illustrating the state that the middle frame body 50 is integrated with the battery element 20 and the positive and negative electrode-side plates 32 and 34. FIG. 10 is a perspective view illustrating the appearance of a sub-assembly product 12.

With referring to FIG. 6, the process first provides the respective components constituting the sub-assembly product 12 or more specifically the battery element 20, the positive electrode-side plate 32, the negative electrode-side plate 34 and the middle frame body 50 (step S100). The process subsequently welds one collector foil of the battery element 20, for example, the positive electrode collector foil 22 to the outer peripheral plate section 32a of the positive electrode-side plate 32 (step S110). This state is illustrated in FIG. 7. The main body of the battery element 20 is placed in the recess of the positive electrode-side plate 32, and the positive electrode collector foil 22 is welded to the outer peripheral plate section 32a (for example, by spot welding) with a welding electrode (not shown) in a welding region WF where the outer peripheral plate section 32a is joined with the positive electrode collector foil 22. The positive electrode-side plate 32 is accordingly integrated with the battery element 20 at the outer peripheral plate section 32a.

The process subsequently welds the other collector foil of the battery element 20, for example, the negative electrode collector foil 24 to the outer peripheral plate section 34a of the negative electrode-side plate 34 (step S120). This state is illustrated in FIG. 8. The battery element 20 placed in the recess of the positive electrode-side plate 32 is tilted to have the side of the negative electrode collector foil 24 lifted up from the positive electrode-side plate 32. This secures a work space for welding operation with a welding electrode (not shown) on the side of the negative electrode collector foil 24. In this state, the negative electrode-side plate 34 is placed to cover the main body of the battery element 20 in its recess. The negative electrode collector foil 24 is then welded to the outer peripheral plate section 34a with the welding electrode in a welding region WF where the outer peripheral plate section 34a is joined with the negative electrode collector foil 24. This integrates the negative electrode-side plate 34 as well as the positive electrode-side plate 32 with the battery element 20, so that the battery element 20 is obliquely placed between the positive electrode-side plate 32 and the negative electrode-side plate 34 as illustrated in FIG. 9.

The process subsequently inserts the left-side frame section 50L and the right-side frame section 50R of the middle frame body 50 from both sides of the battery element 20 as illustrated in FIG. 9, joins the left-side and right-side frame sections 50L and 50R with each other on their opening end faces, and presses the positive electrode-side plate 32 and the negative electrode-side plate 34 against the middle frame body 50 in this state (step S130). As a result of this pressing, the battery element 20 is placed in the frame shape of the middle frame body 50 in the state that the positive electrode collector foil 22 and the negative electrode collector foil 24 are extended straight from the main body of the battery element 20 and is covered by the positive electrode-side plate 32 and the negative electrode-side plate 34 across the middle frame body 50. The battery element 20 is kept in the state that the positive and negative electrode collector foils 22 and 24 are extended straight from the main body of the battery element 20. The sub-assembly product 12 of FIG. 10 is accordingly obtained at step S130, where the middle frame body 50 with the battery element 20 set in its frame shape is integrated with the positive electrode-side plate 32 and the negative electrode-side plate 34. This sub-assembly product 12 is subject to the subsequent process flow. The above pressing maintains the state that the left-side frame section 50L and the right-side frame section 50R are joined with each other on their opening end faces. Alternatively the left-side frame section 50L and the right-side frame section 50R may be bonded to each other on their opening end faces or may be fixed to each other by means of concave and convex fitting elements formed on the respective opening end faces. The opening end faces of the left-side and right-side frame sections 50L and 50R are easily bonded to each other without any difficulty, since the outer peripheral frame body 40 is formed by the following process. According to the embodiment, the positive electrode collector foil 22 and the negative electrode collector foil 24 are placed and fit in the collector foil holding parts 52 of the middle frame body 50. In cooperation with integration by pressing at step S130 described above, this more effectively secures integration of the middle frame body 50 with the battery element 20.

Figure 11:
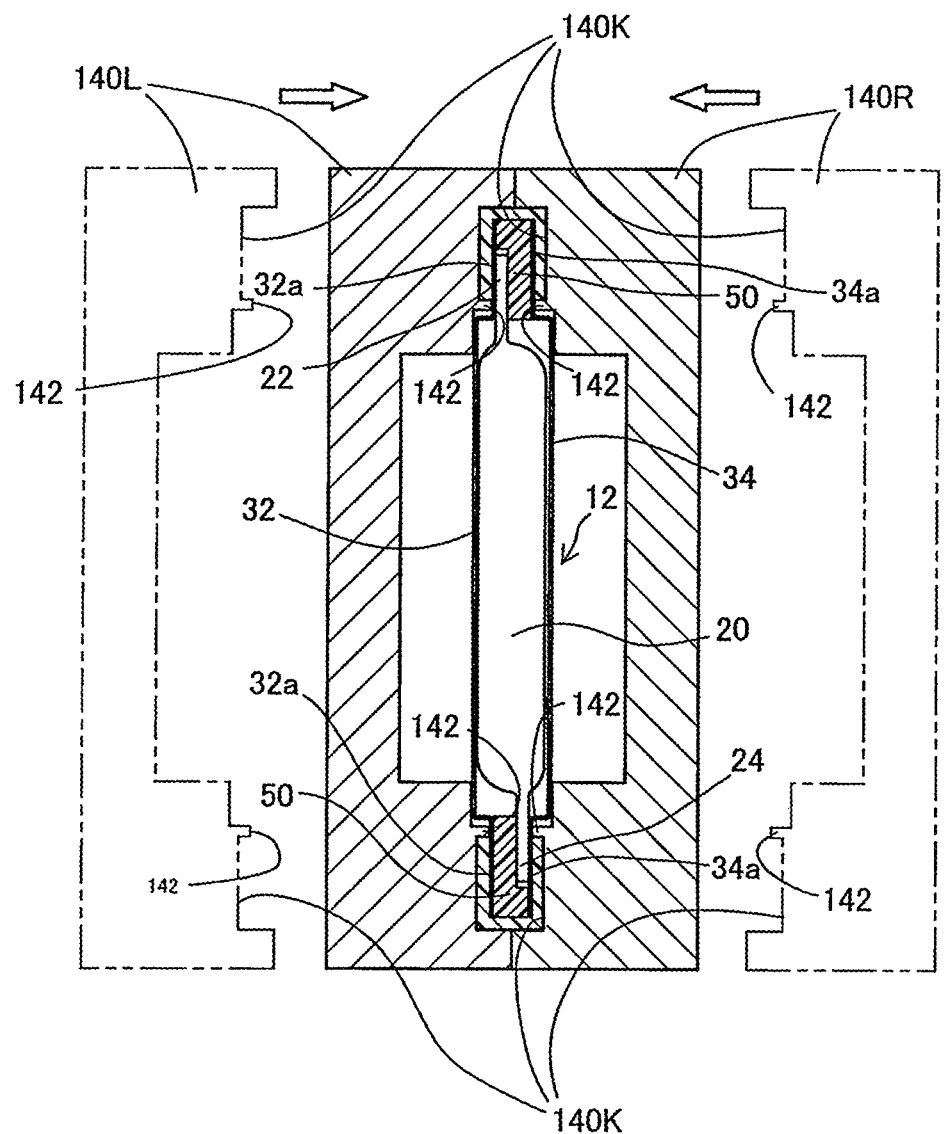
FIG. 11 is a diagram illustrating the sub-assembly product 12 with the mold.

The sub-assembly product 12 obtained as described above is set in a mold (step S140). FIG. 11 is a diagram illustrating the sub-assembly product 12 with the mold. As illustrated, the mold is a split mold consisting of a left mold part 140L and a right mold part 140R. The left mold part 140L and the right mold part 140R are joined tougher to form a cavity 140K, which surrounds the outer periphery of the sub-assembly product 12 along the entire circumference of the sub-assembly product 12. More specifically, the cavity 140K surrounds the outer peripheral plate section 32a of the positive electrode-side plate 32 and the outer peripheral plate section 34a of the negative electrode-side plate 34, which face each other across the middle frame body 50 in the sub-assembly product 12, along the circumference in the frame shape to include the circumferential end faces of the positive electrode-side plate 32 and the negative electrode-side plate 34 and the circumferential end face of the middle frame body 50. The left mold part 140L and the right mold part 140R have shoulder projections 142 protruded from inner surfaces of inner peripheral shoulders toward the above cavity 140K to press the outer peripheral plate section 32a of the positive electrode-side plate 32 against the middle frame body 50 and press the outer peripheral plate section 34a of the negative electrode-side plate 34 against the middle frame body 50, so as to keep the sub-assembly product 12. After the sub-assembly product 12 is set in the mold as described above, the process injects an insulating resin into the cavity 140K to make the sub-assembly product 12 subject to insert molding (step S150). The insert molding forms the outer peripheral frame body 40 in the cavity 140K. The outer peripheral frame body 40 formed in the cavity 140K covers the outer peripheral plate section 32a of the positive electrode-side plate 32 and the outer peripheral plate section 34a of the negative electrode-side plate 34, which face each other across the middle frame body 50, along the circumference in the frame shape to include the circumferential end faces of the positive electrode-side plate 32 and the negative electrode-side plate 34 and the circumferential end face of the middle frame body 50.

After injection of the resin, the process waits until the resin is cooled and cured and subsequently removes the mold (step S160). The battery module 10 shown in FIG. 1 is accordingly obtained. The battery unit 100 shown in FIG. 5 is then obtained by stacking the battery modules 10 and fastening the stack structure with the fastening belt 90 as illustrated in FIG. 5 (step S170).

As described above, in the battery module 10 of the embodiment, the battery element 20 placed in the frame shape of the insulating outer peripheral frame body 40 is covered by the positive electrode-side plate 32 and the negative electrode-side plate 34 to be contained by both the positive and negative electrode-side plates 32 and 34 and the middle frame body 50. After that, insert molding is performed to form the outer peripheral frame body 40, which covers the outer peripheral plate section 32a of the positive electrode-side plate 32 and the outer peripheral plate section 34a of the negative electrode-side plate 34 along the circumference in the frame shape. This outer peripheral frame body 40 covers the surfaces of the outer peripheral plate sections 32a and 34a to include the circumferential end faces of the positive electrode-side plate 32 and the negative electrode-side plate 34 and the circumferential end face of the middle frame body 50 and seals the battery element 20. In the battery module 10 of the embodiment, the battery element 20 is readily sealed by only placing the battery element 20 and performing insert molding of the outer peripheral frame body 40. Moreover, the outer peripheral frame body 40 covers the surfaces of the outer peripheral plate sections 32a and 34a to include the circumferential end faces of the positive electrode-side plate 32 and the negative electrode-side plate 34 and the circumferential end face of the middle frame body 50. There is no need of bonding or welding the resin components to achieve such covering. This simplifies the process and reduces the cost. Additionally, the outer peripheral frame body 40 that covers the outer peripheral plate sections as described above is readily formed by insert molding.

In the course of insert molding of the outer peripheral frame body 40, the positive electrode-side plate 32 and the negative electrode-side plate 34 may be joined with the outer peripheral frame body 40 as described below. More specifically, the surfaces of the outer peripheral plate sections 32a and 34a of the positive and negative electrode-side plates 32 and 34 may be joined with the inner surface of the outer peripheral frame body 40 by the following procedure. A polar functional group such as carboxyl group, amino group or hydroxyl group is given to the surfaces of the outer peripheral plate sections 32a and 34a of the positive and negative electrode-side plates 32 and 34. One available method of giving the polar functional group activates an organic compound with radicals generated by plasma produced in a discharge gas and gives the polar functional group to the surfaces of the outer peripheral plate sections 32a and 34a by the activated organic compound. The insulating resin used to form the outer peripheral frame body 40 is mixed with an adhesive modifier including an adhesive functional group, for example, epoxy group, which interacts with the polar functional group described above. The sub-assembly product 12 is placed in the left and right mold parts 140L and 140R (FIG. 11) as described above and is subjected to insert molding by injecting the insulating resin mixed with the adhesive modifier into the cavity 140K. This joins the positive electrode-side plate 32 and the negative electrode-side plate 34 made of metal with the outer peripheral frame body 40 made of resin and bonds the positive electrode-side plate 32 and the negative electrode-side plate 34 to the outer peripheral frame body 40 by the interaction of the polar function group with the adhesive functional group. This enhances the reliability of sealing the battery element 20 by the outer peripheral frame body 40.

The process of the embodiment forms the sub-assembly product 12, in which the middle frame body 50 with the battery element 20 placed in its frame shape is integrated with the positive electrode-side plate 32 and the negative electrode-side plate 34, in order to obtain the battery module 10 as the completed product including the outer peripheral frame body 40. The sub-assembly product 12 is readily handled for subsequent formation of the outer peripheral frame body 40 and facilitates transportation and storage as half-finished products.

In the battery module 10 of the embodiment, both the positive electrode-side plate 32 and the negative electrode-side plate 34 have convexes, which are formed in a convex shape on the respective centers to be convex outward and cover the battery element 20 contained in the frame shape of the middle frame body 50. The convex shape enhances the strengths of both the positive electrode-side plate 32 and the negative electrode-side plate 34. This improves the strength of each battery module 10 and also ensures the strength of the battery unit 100, which is formed by stacking the battery modules 10 and binding the battery modules 10 in the stacking direction, against the binding force.

In the battery module 10 of the embodiment, the middle frame body 50 in which the battery element 20 is placed is split vertically at specific facing frame positions into two sections, i.e., the left-side frame section 50L and the right-side frame section 50R. This split structure facilitates the battery element 20 to be placed in the frame shape of the middle frame body 50. Moreover, as shown in FIG. 9, even after the battery element 20 is covered by the positive electrode-side plate 32 and the negative electrode-side plate 34, this split structure causes the battery element 20 to be readily placed in the frame shape of the middle frame body 50.

The following describes the process of joining the left-side frame section 50L and the right-side frame section 50R on their opening end faces. The middle frame body 50 has the left-side frame section 50L and the right-side frame section 50R, which are joined with each other on their opening end faces. Their joint position is the joint position of resin components and is extended from inside of the frame to the peripheral surface outside of the frame in the sub-assembly product 12 and in the battery module 10. In the battery module 10 of the embodiment, however, the outer peripheral frame body 40 covers the surfaces of the outer peripheral plate sections 32a and 34a to include the circumferential end faces of the positive electrode-side plate 32 and the negative electrode-side plate 34 and the circumferential end face of the middle frame body 50. Even when the two frame sections 50L and 50R are not bonded to each other at the above joint position, which is the joint position of resin components, covering the circumferential end face of the middle frame body 50 by the outer peripheral frame body 40 prevents a gas leakage accompanied with an increase in internal pressure of the battery module 10 and also prevents invasion of a gas or a liquid from outside to inside of the battery module 10. Accordingly, there is no need to bond or weld the joint position of the left-side frame section 50L and the right-side frame section 50R, which are joined with each other on their opening end faces, in the process of placing the battery element 20 in the frame shape of the middle frame body 50, as long as the positive electrode-side plate 32 and the negative electrode-side plate 34 ensure integration of the sub-assembly product 12. Even when the two frame sections 50L and 50R are bonded, only simple bonding is sufficient.

Figure 12:
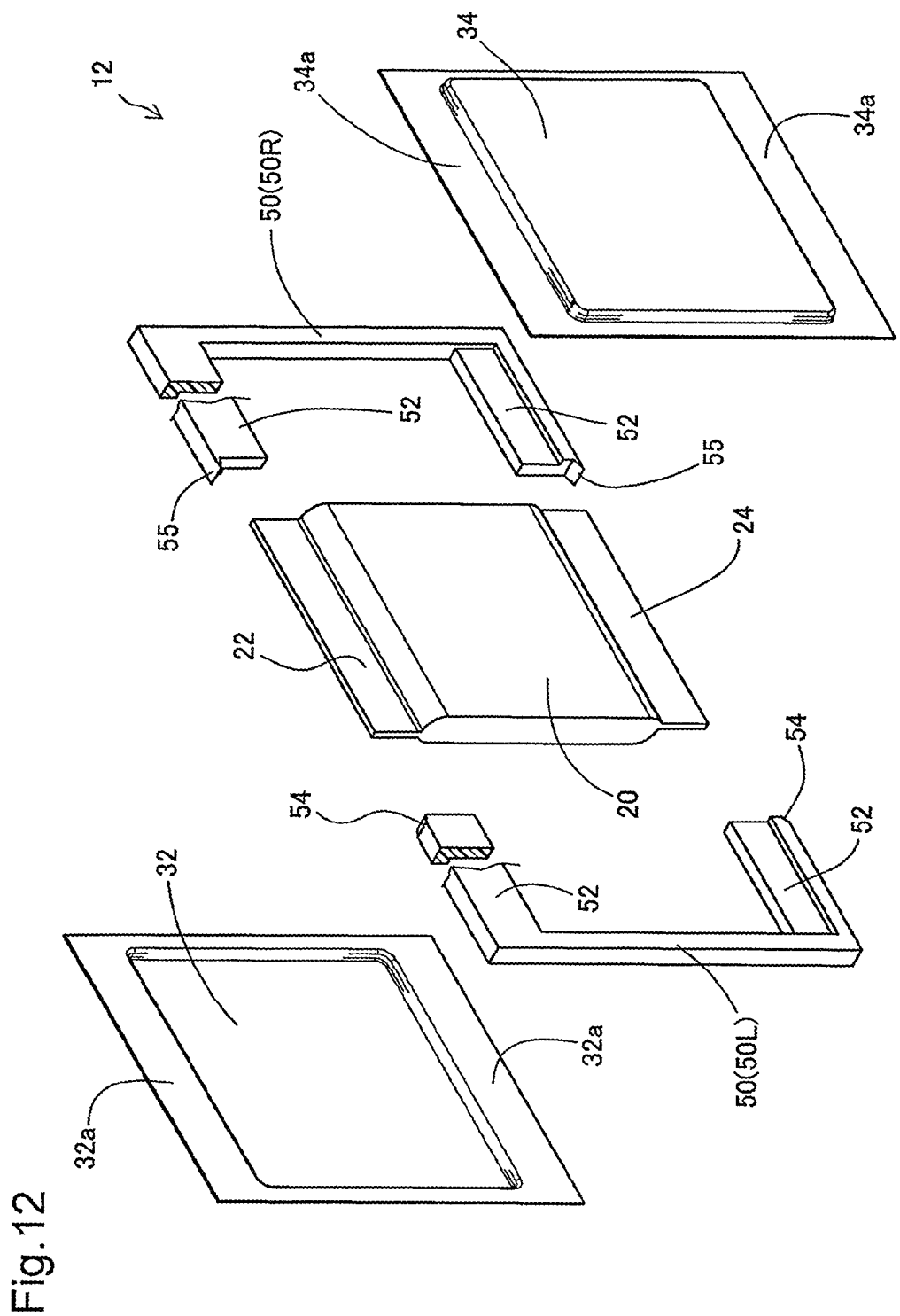
FIG. 12 is an exploded perspective view of a sub-assembly product 12 using a middle frame body 50 according to a modification.
Figure 13:
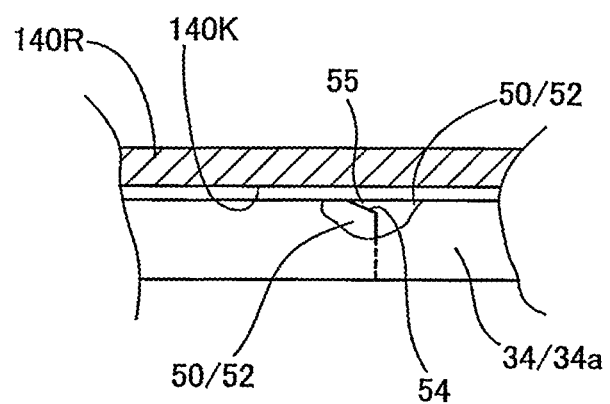
FIG. 13 is a diagram illustrating the advantageous effect of the middle frame body 50 according to the modification.

Some modifications are described below. FIG. 12 is an exploded perspective view of a sub-assembly product 12 using a middle frame body 50 according to a modification. As illustrated, a left-side frame section 50L and a right-side frame section 50R constituting the middle frame body 50 have cutouts 54 and tongue elements 55 on their opening end faces. The tongue elements 55 are formed to be placed on the cutouts 54, when the left-side frame section 50L and the right-side frame section 50R are joined with each other on their opening end faces. FIG. 13 is a diagram illustrating the advantageous effect of the middle frame body 50 according to the modification.

When the sub-assembly product 12 using the middle frame body 50 of the modification is set in the mold shown in FIG. 11, the middle frame body 50 is contained in the cavity 140K in the state that the tongue elements 55 are placed on the cutouts 54. When a resin (molten resin) for formation of the outer peripheral frame body 40 is injected into the cavity 140K, the heat of the resin is transmitted from the end faces of the middle frame body 50 to inside of the middle frame body 50. The tongue elements 55 have only small volumes and are melted by the heat of the resin to be welded to the cutouts 54. In this modification, the opening end faces of the left-side frame section 50L and the right-side frame section 50R are blocked by welding the tongue elements 55. In cooperation with covering the outer periphery of the battery module 10 in the frame shape by the outer peripheral frame body 40, this enhances the effectiveness of preventing a gas leakage accompanied with an increase in internal pressure of the battery module 10 and the effectiveness of preventing invasion of a gas or a liquid from outside to inside of the battery module 10.

Figure 14:
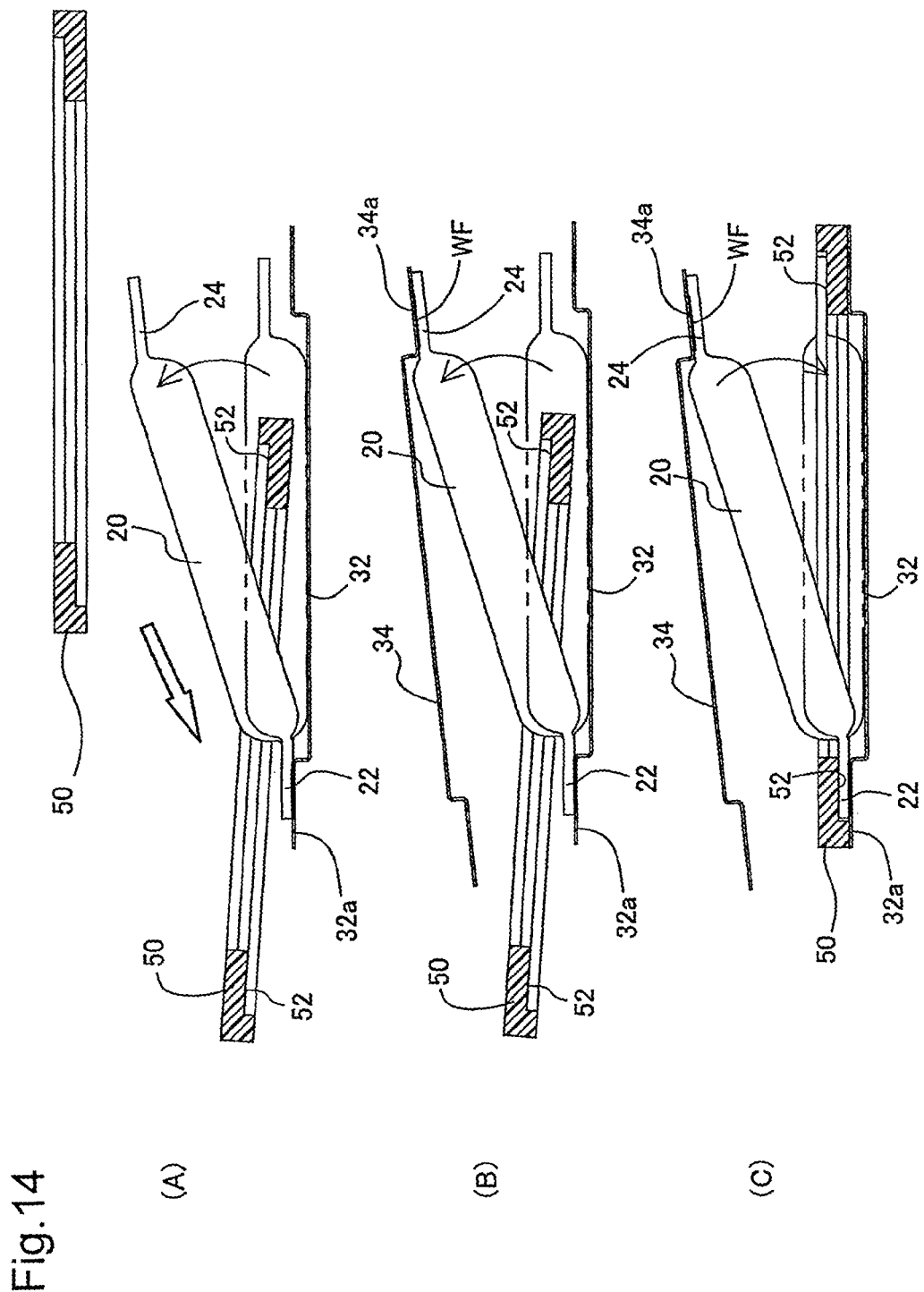
FIG. 14 is a diagram illustrating the state of assembling a sub-assembly product 12 using a middle frame body 50 according to another modification.

FIG. 14 is a diagram illustrating the state of assembling a sub-assembly product 12 using a middle frame body 50 according to another modification. In this modification, the middle frame body 50 is not split into two sections but is formed in an integral frame shape. In the modification using this middle frame body 50, the outer peripheral plate section 32a of the positive electrode-side plate 32 is welded and fixed to the positive electrode collector foil 22 of the battery element 20 as described above. After that, the battery element 20 is tilted and placed in the frame shape of the middle frame body 50 (FIG. 14A). The outer peripheral plate section 34a of the negative electrode-side plate 34 is subsequently welded and fixed to the negative electrode collector foil 24 of the battery element 20 (FIG. 14B). The middle frame body 50 is then moved, such that the positive electrode collector foil 22 and the negative electrode collector foil 24 are held by collector foil holding parts 52 (FIG. 14C). The battery element 20 is then placed back with the negative electrode-side plate 34 toward the positive electrode-side plate 32. This also produces the sub-assembly product 12, in which the battery element 20 placed in the frame shape of the middle frame body 50 is integrated with the positive electrode-side plate 32 and the negative electrode-side plate 34.

Figure 15:
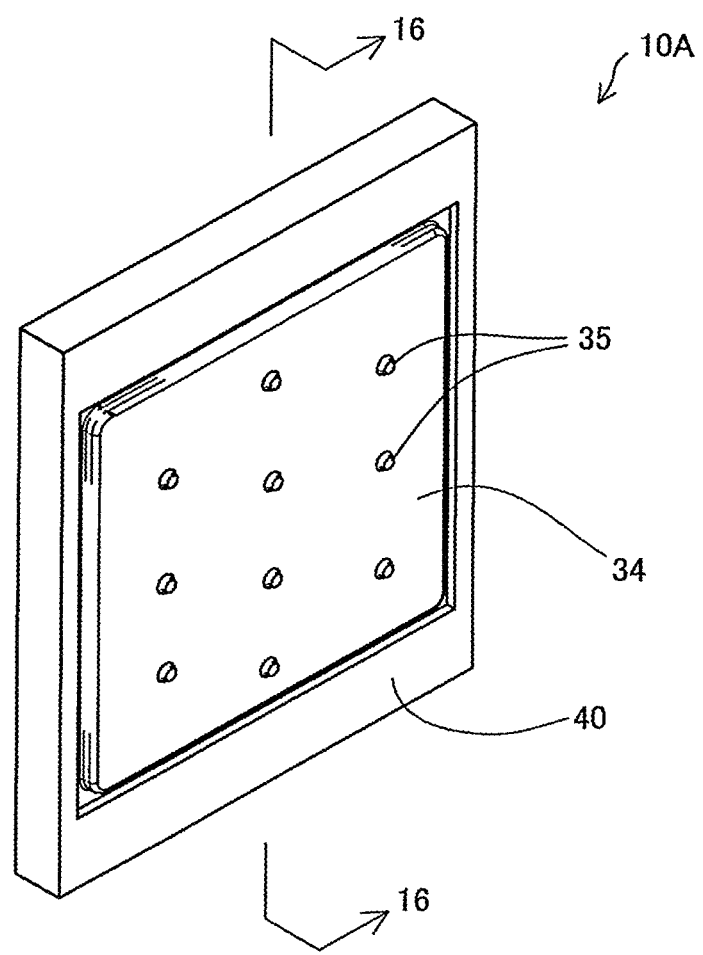
FIG. 15 is a perspective view illustrating the appearance of a battery module 10A according to a second embodiment.
Figure 16:
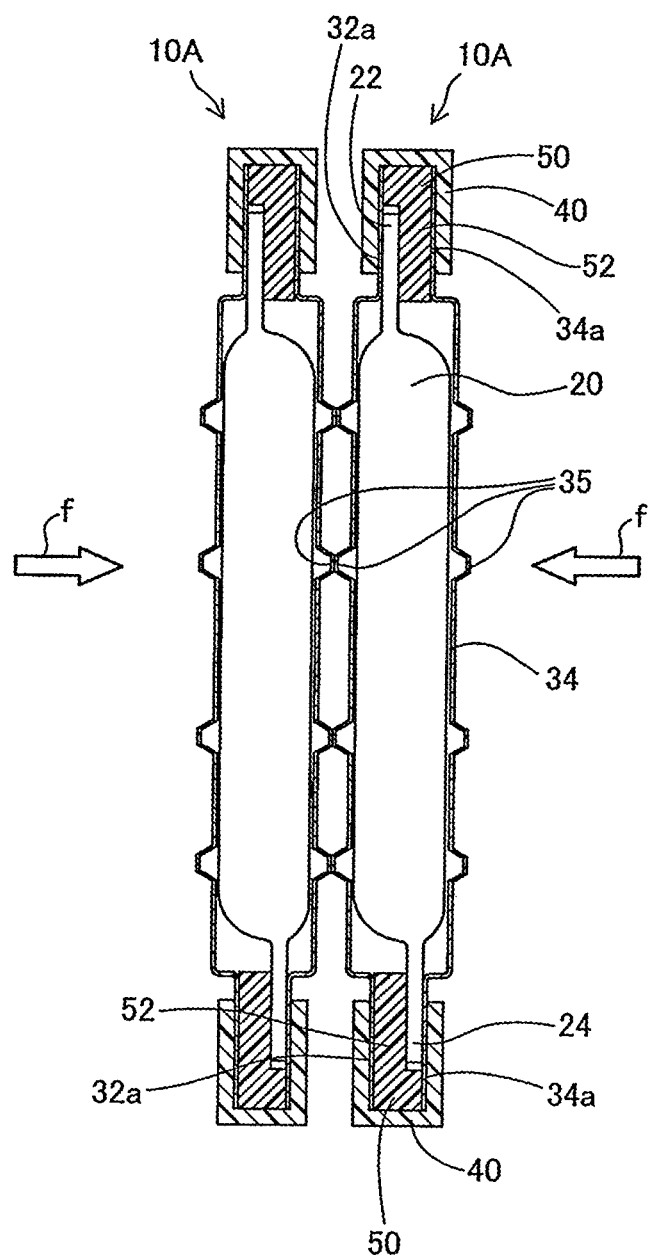
FIG. 16 is a diagram illustrating a cross sectional view of adjacent battery modules 10A, taken on a line 16-16 in FIG. 15.

FIG. 15 is a perspective view illustrating the appearance of a battery module 10A according to a second embodiment. FIG. 16 is a diagram illustrating a cross sectional view of adjacent battery modules 10A, taken on a line 16-16 in FIG. 15.

This battery module 10A has projections 35 on convex outer surfaces of a positive electrode-side plate 32 and a negative electrode-side plate 34. These projections 35 are arranged at intervals over the respective convex outer surfaces and are formed by pressing or pushing out the convex top surfaces of the positive electrode-side plate 32 and the negative electrode-side plate 34 as parts of the positive and negative electrode-side plates 32 and 34 as shown in FIG. 16. The top faces of these projections 35 of adjacent battery modules 10A are in contact with each other in the stacked state of the battery modules 10A. Such structure of the battery module 10A of this embodiment accordingly ensures the electrical continuity between the adjacent battery modules 10A via the projections 35 in contact with each other on the respective top faces as shown in FIG. 16 and more specifically in a battery unit 100 provided by stacking the battery modules 10A as shown in FIG. 5. In the battery unit 100, the fastening belt 90 applies the binding force f to the battery modules 10A. The contact of the adjacent battery modules 10A via the narrow areas of the top faces of the projections 35 increases the contact pressure and ensures the electrical continuity between the adjacent battery modules 10A with high reliability. According to this embodiment, the projections 35 are arranged at intervals over the convex outer surfaces of the positive electrode-side plate 32 and the negative electrode-side plate 34. The individual projections 35 advantageously ensure the electrical continuity, so as to further improve the reliability of the electrical continuity between the adjacent battery modules 10A. Each battery module 10A is in contact with an adjacent battery module 10A via the respective projections 35, so that spaces are formed between the positive electrode-side plate 32 and the negative electrode-side plate 34 of the adjacent battery modules 10A. For example, in an application of introducing the dry cold air between the adjacent battery modules 10A, these spaces facilitate heat release from the positive electrode-side plate 32 and the negative electrode-side plate 34 and thereby suppress a temperature rise of the battery element 20 contained in the battery module 10A.

Figure 17:
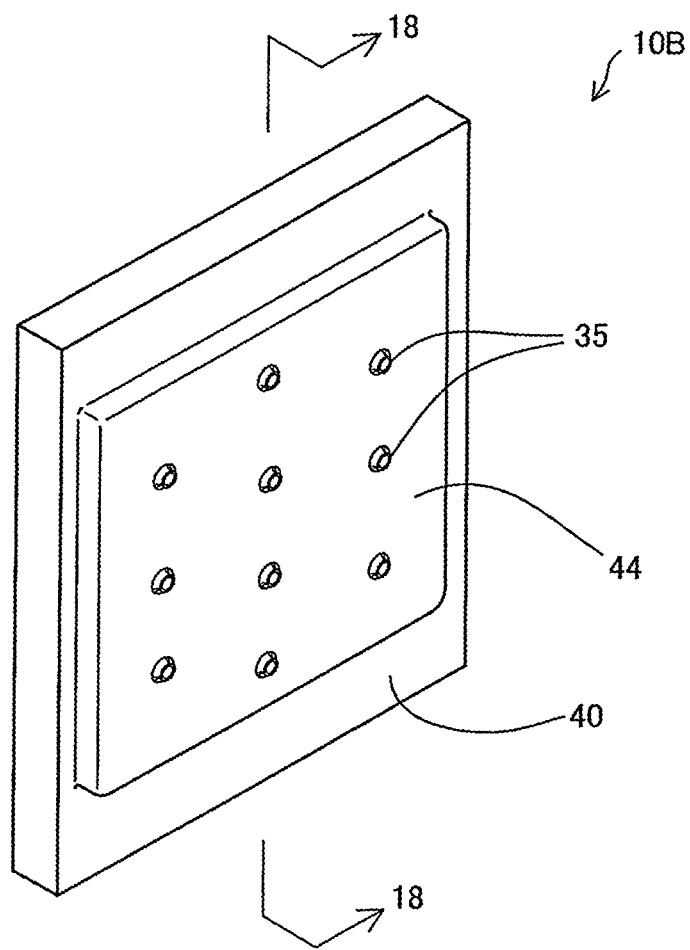
FIG. 17 is a perspective view illustrating the appearance of a battery module 10B with projections 35 according to a modification.
Figure 18:
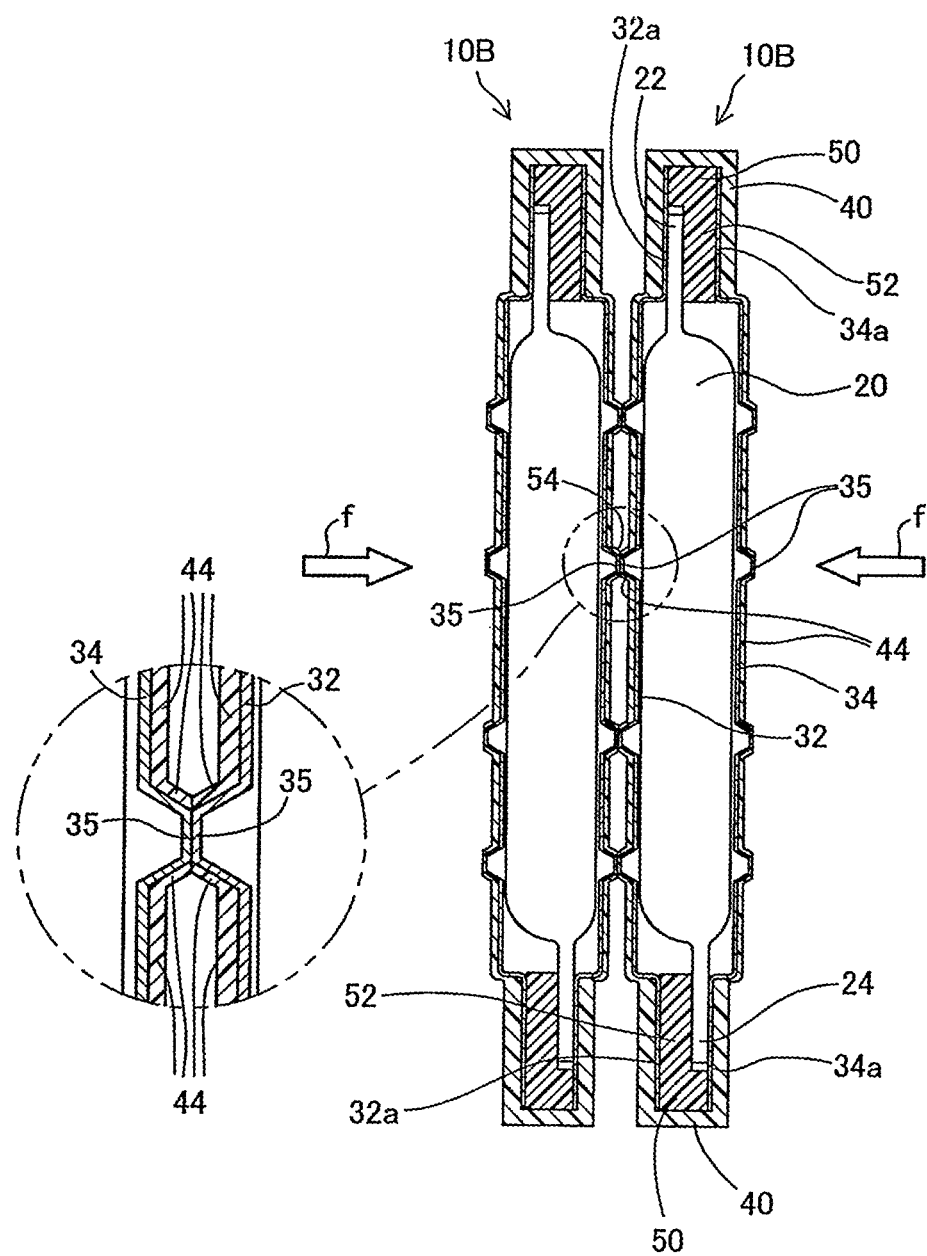
FIG. 18 is a diagram illustrating a cross sectional view taken on a line 18-18 in FIG. 17 and an enlarged view of its main part.
Figure 19:
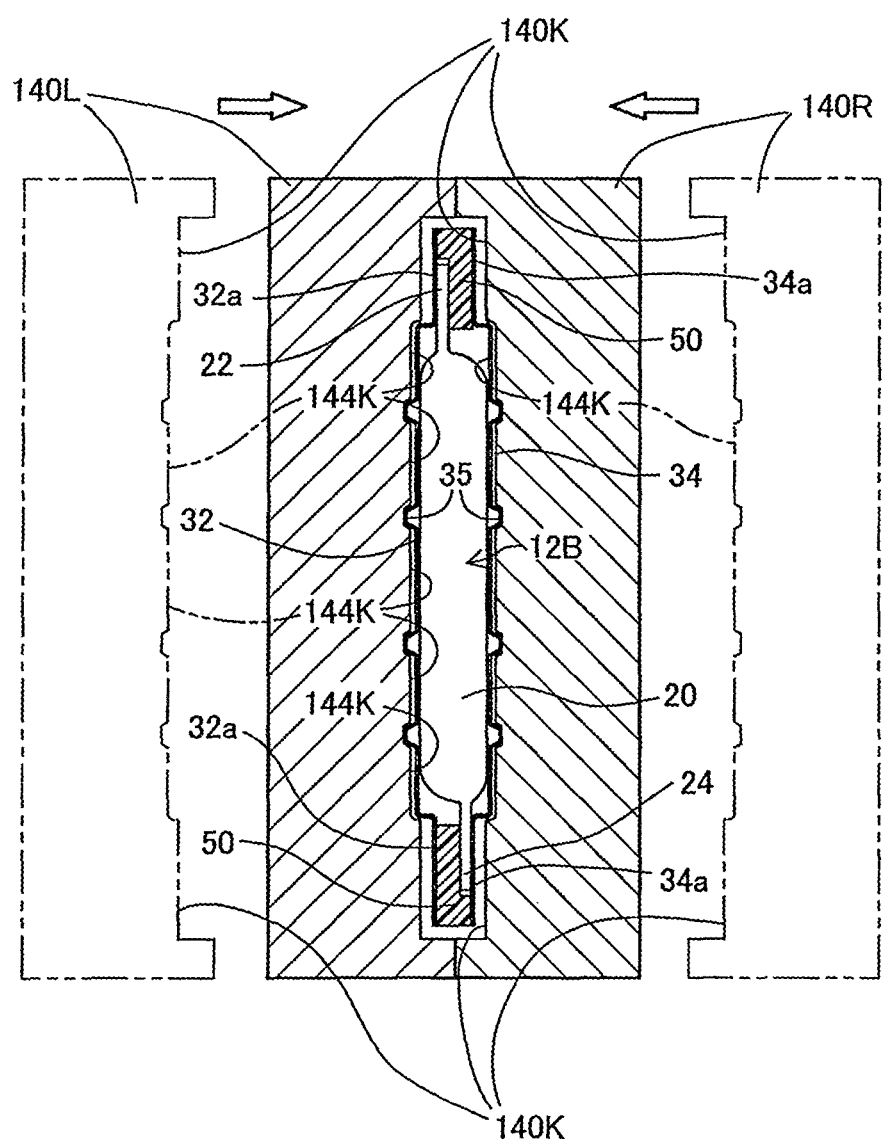
FIG. 19 is a diagram illustrating a process of insert molding, together with a mold.

FIG. 17 is a perspective view illustrating the appearance of a battery module 10B with projections 35 according to a modification. FIG. 18 is a diagram illustrating a cross sectional view taken on a line 18-18 in FIG. 17 and an enlarged view of its main part. FIG. 19 is a diagram illustrating a process of insert molding, together with a mold.

As illustrated, in the battery module 10B of this modification, projections 35 are provided on convex outer surfaces of a positive electrode-side plate 32 and a negative electrode-side plate 34, and the convex outer surfaces of the positive electrode-side plate 32 and the negative electrode-side plate 34 are covered with a resin coating layer 44. The resin coating layer 44 is formed to be connected with an outer peripheral frame body 40 which surrounds the outer periphery of the battery module 10B. Only the top faces of the projections 35 are not covered but are exposed. In a battery unit 100 provided by stacking the battery modules 10B, the projections 35 ensure the electrical continuity between the adjacent battery modules 10B, and spaces are formed between the positive electrode-side plate 32 and the negative electrode-side plate 34 of the adjacent battery modules 10B. The outer surfaces of the positive electrode-side plate 32 and the negative electrode-side plate 34 and the peripheral wall surfaces of the projections 35 are covered with the resin coating layer 44. For example, in an application of supplying the cold air between the adjacent battery modules 10B to suppress a temperature rise of the battery element 20, even when the cold air includes moisture, the resin coating layer 44 protects the outer surfaces of the positive electrode-side plate 32 and the negative electrode-side plate 34 and the peripheral wall surfaces of the projections 35, as well as the inside covered by the outer peripheral frame body 40 from the moisture. The moisture may lead to corrosion of the metal. The battery module 10B of this modification, however, protects its components from the moisture and prevents corrosion of, for example, the positive electrode-side plate 32, the negative electrode-side plate 34 and the positive electrode collector foil 22, thus enhancing the weather resistance.

The battery module 10B having the resin coating layer 44 is manufactured by using a mold shown in FIG. 19. A sub-assembly product 12B with projections 35 is set in a left mold part 140L and a right mold part 140R having center cavities 144K connecting with cavities 140K, and the battery module 10B is readily obtained by insert molding. In this case, the center cavity 144K has recesses which respectively surround the peripheral wall surfaces of the projections 35 and are arranged at the pitches of the projections 35.

Figure 20:
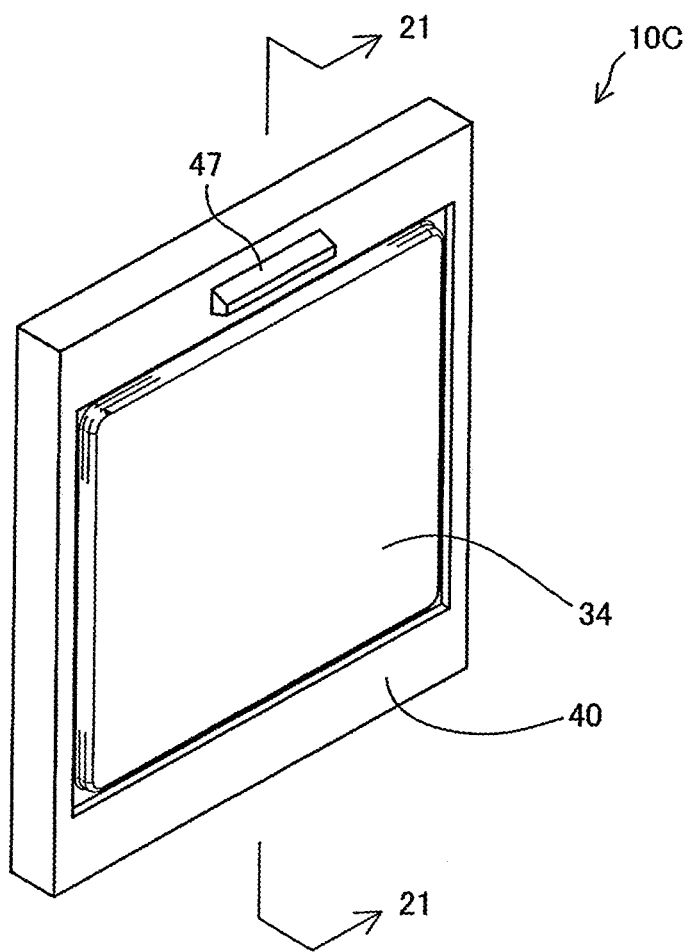
FIG. 20 is a perspective view illustrating the appearance of a battery module 10C according to another modification.
Figure 21:
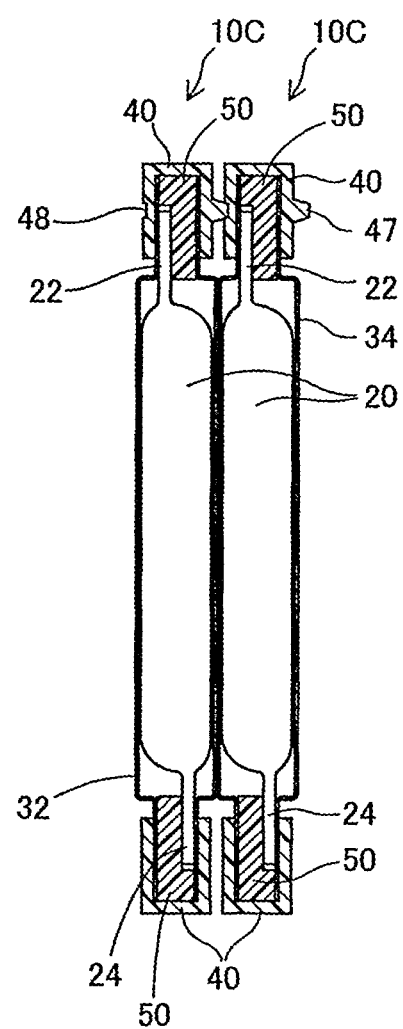
FIG. 21 is a diagram illustrating a cross sectional view of adjacent battery modules 10C, taken on a line 21-21 in FIG. 20.
Figure 22:
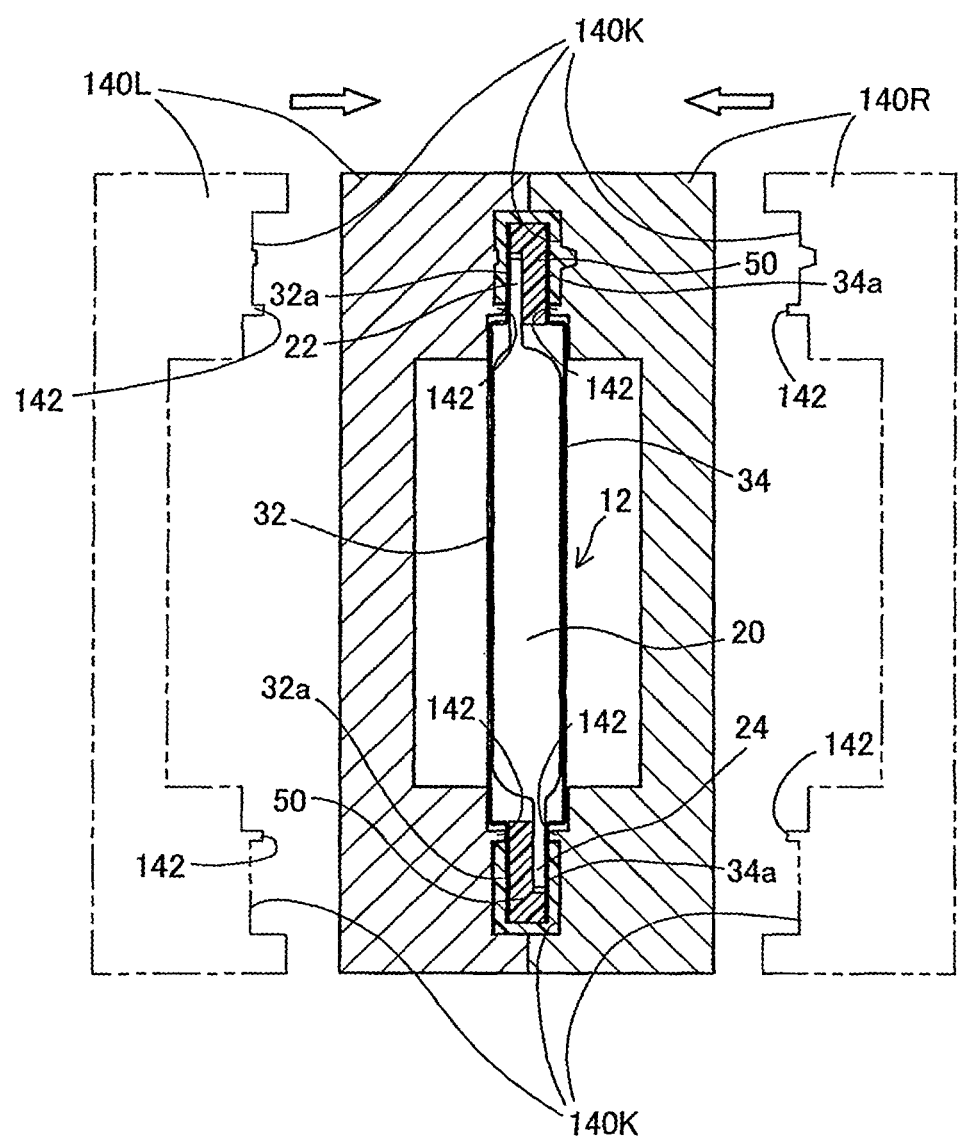
FIG. 22 is a diagram illustrating a process of insert molding, together with a mold.

FIG. 20 is a perspective view illustrating the appearance of a battery module 10C according to another modification. FIG. 21 is a diagram illustrating a cross sectional view of adjacent battery modules 10C, taken on a line 21-21 in FIG. 20. FIG. 22 is a diagram illustrating a process of insert molding, together with a mold.

As illustrated, the battery module 10C of this modification has a projection 47 on one surface of an outer peripheral frame body 40 and a recess 48 on the opposite surface of the outer peripheral frame body 40, which the top of the projection 47 is fit in (FIG. 21). The projection 47 has a height protruded outward from the convex outer surface of a negative electrode-side plate 34. As shown in FIG. 22, the projection 47 is formed as a projection in a shape inverted from a recess formed in the cavity 140K of the right mold part 140R to be integrated with an outer peripheral frame body 40 in the process of insert molding of the outer peripheral frame body 40. Similarly the recess 48 is formed as a recess in a shape inverted from a projection formed in the cavity 140K of the left mold part 140L to be integrated with the outer peripheral frame body 40 in the process of insert molding of the outer peripheral frame body 40.

In the state of stacking the battery modules 10C of this modification as shown in FIG. 21, the top of the projection 47 of a battery module 10C is inserted and fit in the recess 48 of an adjacent battery module 10C. In manufacture of a battery unit 100 by stacking the battery modules 10C as shown in FIG. 5, this arrangement positions the adjacent battery modules 10C and thereby facilitates tacking of the battery modules 10C.

The foregoing describes some embodiments and modifications of the invention. The invention is, however, not limited to these embodiments or modifications but may be implemented by various other configurations without departing from the scope of the invention. For example, in the above embodiment, the outer peripheral plate section 32a and the outer peripheral plate section 34a are respectively welded to the positive electrode collector foil 22 and the negative electrode collector foil 24. The outer peripheral plate sections may alternatively be joined with and fixed to the corresponding collector foils by any other suitable technique, for example, caulking, punching press, or ultrasonic welding.

The middle frame body 50 is split into the left-side and right-side frame sections according to the above embodiment as shown in FIG. 4. The middle frame body may alternatively be split horizontally at specific facing frame positions into an upper-side frame section and a lower-side frame section.

In the battery module 10B of the modification having the projections 35 formed on the respective convex outer surfaces of the positive electrode-side plate 32 and the negative electrode-side plate 34 and the resin coating layer 44 provided to cover these components, the resin coating layer 44 is formed to be connected with the outer peripheral frame body 40. This structure is, however, not restrictive. For example, each of the positive electrode-side plate 32 and the negative electrode-side plate 34 may be provided as a resin laminate steel plate having a resin coating layer on one surface. Projections 35 may be press-formed on the resin coating layer surface, and the resin coating layer may be removed from the top faces of the projections 35. The battery element 20 may be covered across the middle frame body 50 by the positive electrode-side plate 32 and the negative electrode-side plate 34 made of the resin laminate steel plates (FIGS. 9 and 10), and the outer peripheral frame body 40 may be formed by using the mold of Fig.

The invention claimed is:

1. A battery module containing a battery element, comprising:
   an insulating frame body that is formed in a frame shape to surround, and contain, the battery element and that holds positive and negative collector foils of the battery element;
   conductive first and second plates that are provided to cover the battery element contained in the frame shape of the frame body across the frame body and that include outer surfaces, the first plate has electrical continuity with one of the positive and negative collector foils held by the frame body, the second plate has electrical continuity with the other of the positive and negative collector foils held by the frame body; and
   an insulating outer peripheral frame body provided to cover outer peripheral plate sections of the first and second plates along a circumference in a frame shape to include circumferential end faces of the first and second plates and a circumferential end face of the frame body, wherein
   the outer surfaces of the first and second plates are located outward from the insulating outer peripheral frame body.

2. The battery module according to claim 1, wherein the frame body containing the battery element is integrated with the first and second plates.

3. The battery module according to claim 1, wherein the outer peripheral frame body is formed of an insulating resin.

4. The battery module according to claim 3, wherein the outer peripheral plate sections of the first and second plates are joined with the outer peripheral frame body.

5. The battery module according to claim 1, wherein the first and second plates are metal plates and are respectively welded to the positive and negative collector foils.

6. The battery module according to claim 1, wherein each of the first and second plates is formed in a convex shape that is convex outward from the battery element contained in the frame body to have a recess in which the battery element contained the frame body is placed.

7. The battery module according to claim 1, wherein the frame body is split at specific facing frame positions into two sections.

8. The battery module according to claim 1, wherein the outer peripheral frame body has a positioning engagement element to engage with and position the outer peripheral frame body of an adjacent battery module in a state of stacking a plurality of the battery modules.

9. The battery module according to claim 1, wherein each of the first and second plates has a projection on an outer surface, which joins with the projection of an adjacent battery module on top faces of the projections in a state of stacking a plurality of the battery modules.

10. A battery unit comprising a plurality of the battery modules according to claim 1, wherein
the plurality of the battery modules are stacked, and a binding force along a stacking direction is applied to the stacked battery modules.

\* \* \* \* \*